United States Patent [19]

Merchel

[11] Patent Number: 5,589,677
[45] Date of Patent: Dec. 31, 1996

[54] PLEDGE LOCK FOR A SHOPPING TROLLEY

[75] Inventor: Horst Merchel, Bietigheim-Bissingen, Germany

[73] Assignee: Vendoret Holding S. A., Luxembourg-Hesperange, Luxembourg

[21] Appl. No.: 623,983

[22] Filed: Mar. 28, 1996

Related U.S. Application Data

[63] Continuation of Ser. No. 254,293, Jun. 6, 1994, abandoned.

[30] Foreign Application Priority Data

Jun. 4, 1993 [DE] Germany .......................... 43 18 627.0
Dec. 8, 1993 [DE] Germany .......................... 43 41 791.4

[51] Int. Cl.⁶ .................................................. G06K 15/00
[52] U.S. Cl. ........................................ 235/383; 235/385
[58] Field of Search ................................. 235/382, 383, 235/385, 375, 380; 70/278

[56] References Cited

U.S. PATENT DOCUMENTS

| | | | |
|---|---|---|---|
| 2,410,845 | 11/1946 | Snell et al. | |
| 3,836,755 | 9/1974 | Ehrat | 235/383 |
| 4,071,740 | 1/1978 | Gogulski | 235/431 |
| 4,373,133 | 2/1983 | Clyne et al. | 235/385 X |
| 4,415,065 | 11/1983 | Sandstedt | 235/383 X |
| 4,766,989 | 8/1988 | Maloeuvre et al. | 194/257 |
| 4,866,661 | 9/1989 | de Prins | 364/900 |
| 4,872,113 | 10/1989 | Dinerstein | 364/401 |
| 4,918,296 | 4/1990 | Hisato et al. | |
| 4,929,819 | 5/1990 | Collins, Jr. | 235/383 |
| 4,965,440 | 10/1990 | Hasegawa | 235/487 |
| 4,973,952 | 11/1990 | Malec et al. | 340/825 |
| 5,047,614 | 9/1991 | Bianco | 235/385 |
| 5,057,677 | 10/1991 | Bertagna et al. | 235/385 X |
| 5,069,324 | 12/1991 | Lepage et al. | 194/212 |
| 5,119,087 | 6/1992 | Lucas | 194/905 X |
| 5,147,021 | 9/1992 | Maruyama et al. | 194/217 |
| 5,250,789 | 10/1993 | Johnsen | 235/385 X |
| 5,285,278 | 2/1994 | Holman | 235/383 X |
| 5,361,871 | 11/1994 | Gupta et al. | 235/383 X |
| 5,478,989 | 12/1995 | Shepley | 235/375 |
| 5,513,507 | 5/1996 | Merchel | 70/278 |

FOREIGN PATENT DOCUMENTS

| | | |
|---|---|---|
| 0077690 | 4/1983 | European Pat. Off. . |
| 0189691 | 8/1986 | European Pat. Off. . |
| A3600307 | 7/1987 | Germany . |
| U9400167 | 4/1994 | Germany . |
| 4319584 | 12/1994 | Germany . |
| 0959713 | 6/1964 | United Kingdom . |
| 2094044 | 9/1982 | United Kingdom . |

OTHER PUBLICATIONS

"Eyeing the Consumer," *The Economist*, 22 Apr. 1989, pp. 63–66.
Echos de L'Industrie, 10463 Science & Vie, May 1991, No. 884, Paris France, p. 126.
"Asymmetrical Cord", IBM Technical Disclosure Bulletin, vol. 24, No. 7B, Dec. 1981.
Electronique Radio Plans, No. 538, 1 Sep. 92, pp. 49–50, 55–56, Les "DSC" D'Ordicam.
Funkschau, West Germany, No. 13, 1986, ISSN pp. 24–28, 'Schlussel, Ausweis, Geldersatz.
Science & Vie, No. 884, May 1991, p. 126.

*Primary Examiner*—Donald T. Hajec
*Assistant Examiner*—Steven Wigmore
*Attorney, Agent, or Firm*—Herbert Dubno

[57] ABSTRACT

The invention relates to a pledge lock for a shopping trolley, having an information carrier which can be temporarily applied in or on the pledge lock which can thus be unlocked and operatively connected to a shop computer, items of information can be read from the information carrier and transmitted to the shop computer and/or items of information which can be transmitted by the shop computer can be stored on the information carrier.

12 Claims, 3 Drawing Sheets

PLEDGE LOCK FOR A SHOPPING TROLLEY

This is a continuation of U.S. application Ser. No. 08/254,293 filed on Jun. 6, 1994, now abandoned.

FIELD OF THE INVENTION

The invention relates to a pledge lock or for an information carrier, more particularly a card, which can be temporarily applied in or on the pledge lock and via which the lock can be unlocked and connected to a shop computer.

BACKGROUND OF THE INVENTION

It is known to attach to shopping trolleys pledge locks via which the trolleys can be locked to one another. The introduction of a coin into the lock releases a shopping trolley from an adjoining trolley, so that it can be used by the customer. It is also known to use a card instead of a coin as shown in European Patent Application 0 545 233.

OBJECTS OF THE INVENTION

It is an object of the invention so to improve a pledge lock and a pledge card, which can be used on or in the pledge lock, that items of information can be applied to the information carrier which are of great use for the shop and/or the customer, while the pledge lock and/or the information carrier are simply constructed, highly efficient in use and highly reliable. It is also an object of the invention so to improve a pledge lock having an information carrier that rebates and information concerning winnings (raffles) can be simply stored and read out. The information carrier, the pledge lock, the shopping trolley and the associated apparatuses can be simply and rapidly manipulated in a fault-free manner.

SUMMARY OF THE INVENTION

These objects are achieved according to the invention by the apparatus in which means is provided so that items of information can be read from the information carrier and transmitted to the shop computer and/or items of information are transmitted by the shop computer to be stored in the information carrier.

Advantageously the pledge lock according to the invention requires no current source in the form of batteries or accumulators, since the required energy can be transmitted by radiation.

The pledge lock or card can be taken off the shopping trolley, to receive or deliver items of information. However, the information carrier, more particularly a card, can also remain in the pledge lock until the shopping trolley was again locked to another trolley or to a collecting station, since in a number of embodiments according to the invention a zone of the information carrier is accessible even when the carrier is in the pledge lock. Moreover, the information carrier can touch contacts inside the pledge lock, thereby creating a connection to the shop computer.

Also the fixed data connection apparatus or the device is an automatic device which can be operated by the customer and which is connected to the shop computer and/or checkout. The very advantageously the information carrier according to the invention receives items of information which are used for purposes of publicity, statistics and/or the provision of advantages to purchasers, more particularly rebates and lottery winnings.

BRIEF DESCRIPTION OF THE DRAWING

The above and other objects, features and advantages of the present invention will become more readily apparent from the following description, reference being made to the accompanying drawing in which.

SPECIFIC DESCRIPTION

A pledge lock 1 is attached to a shopping or luggage trolley (not shown). Either each trolley has a fixed coupling member (not shown) which penetrates into the lock 1 of the adjacent trolley when the trolleys are moved towards one another, or else each trolley bears a coupling member (not shown) which is attached to a chain or a band and which can be inserted manually into the pledge lock 1 of the adjacent trolley. In both cases the penetration of the coupling member releases a pledge which is situated in the lock, in the form of a perforated, key, credit, magnetic, company, identity, identification and/or telephone card. The pledge 2 will be referred to as the information carrier hereinafter, since it not only performs the function of a pledge, but can also carry items of information which can be stored and read, more particularly called up. The detachable means has been represented at 40 in FIG. 1.

If a purchaser or a customer carrying his luggage wishes to use a trolley, he must insert such an information carrier into the slot of the lock 1 of a trolley situated at the end of a row of trolleys. As a result, the coupling member of the adjacent trolley is released, and the trolley can be removed from the row. During the use of the trolley the information carrier 2 remains inside the lock 1, and after the trolley has been used, the trolley is recoupled to another trolley or to a station, so that after the penetration of the coupling member, the information carrier 2 is again released.

The information carrier 2 is checked by the lock and/or the lock determines whether the card is to effect release whether it is an independent card. Whether it is a integrated IC component, the item of information is checked and the coupling member released only if the information agrees. Use can be made of the already commercially available locks or checking apparatuses which are already used on hotel room doors.

If information carriers 2 with a magnetic coating, an IC component and/or some other method of receiving information are used, for example, for clipping i.e., for making of a notch, this information can be used to determine how frequently the particular shop has been visited. Such information therefore is usable for publicity, statistics and/or the provision of gifts, rebates or other advantages. The information carrier can also bear printed publicity matter.

In another embodiment of the invention, in addition to the information carrier 2, a coin can be inserted into the same lock. The lock therefore has, in addition to the receiving means, more particularly, a slot for an information carrier, a second slot (not shown) for a coin. Alternatively, the information carrier 2 and a coin can be optionally introduced into the same receiving means or slot.

Figure 1:
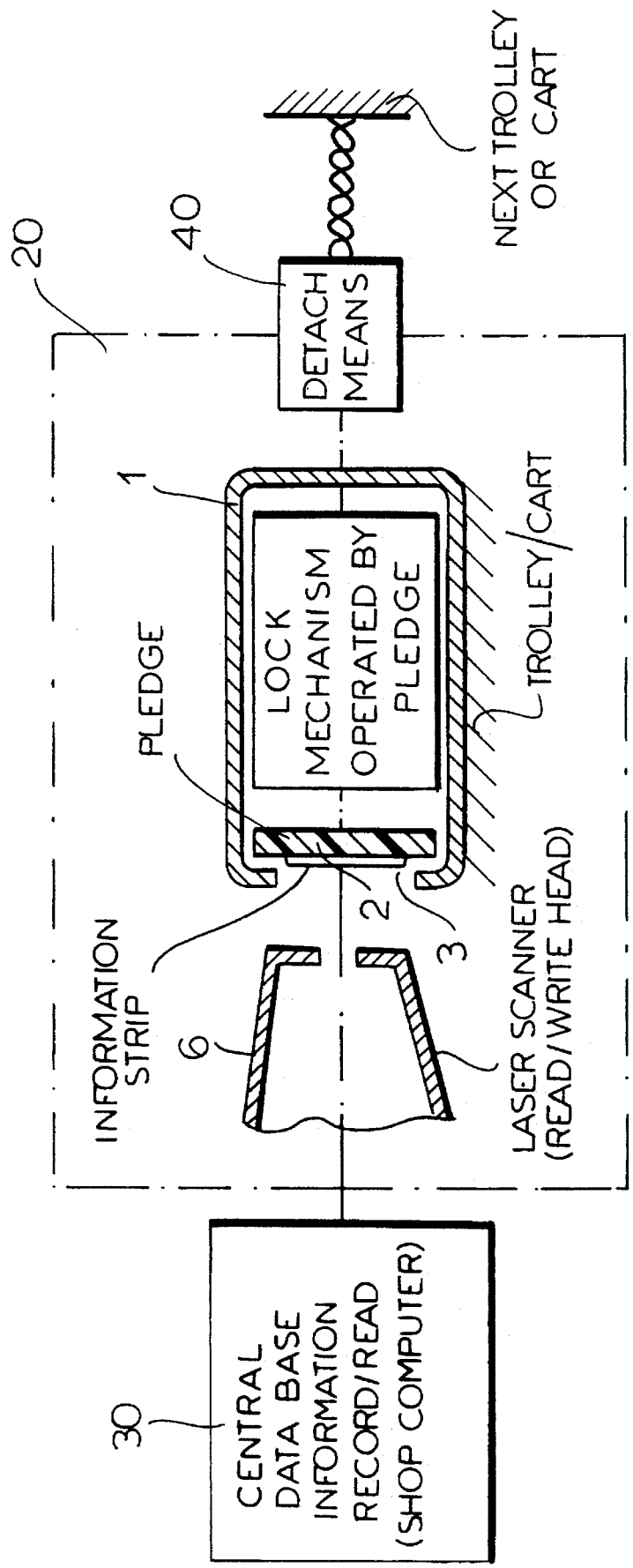
FIG. 1 is a vertical cross-sectional view of a pledge lock having a lateral window through which the vertical pledge card can be reached optically or via other kinds of radiation from a fixed device.
Figure 8A:
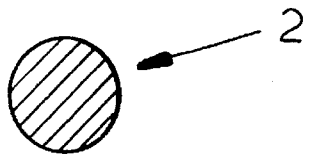
FIGS. 8A–8E are diagrammatic sections illustrating alternative information carriers or cards which can be used.
Figure 8B:
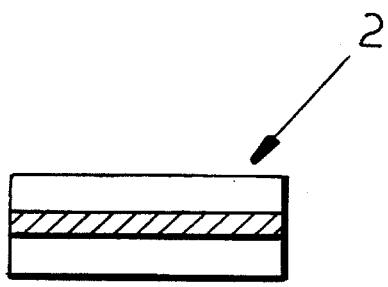
Figure 8C:
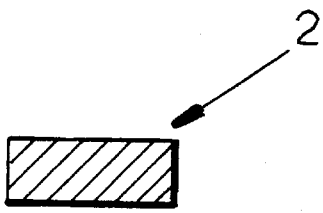
Figure 8D:
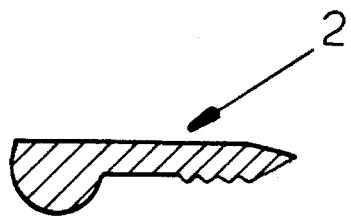
Figure 8E:
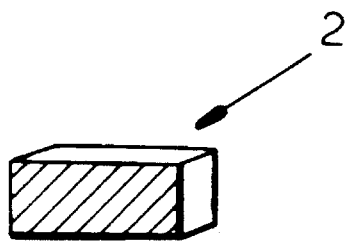

The information carrier 2 is shown in FIG. 1 of the drawing in the form of a flat, elongate card. The information carrier can however also be some other plug-in member such as a pin, ball (FIG. 8A), key (FIG. 8D), plate (FIG. 8C), circular disc (FIG. 8A) (plastic chip) or a parallelepipedic block (FIG. 8E). In this case the information is stored by a chip, a magnetic layer and/or a bar code printed on the information carrier 2.

The pledge lock 1 can have a source of current 13' in the form of a battery or accumulator. The current can also be generated by a solar cell. Advantageously the current source of the pledge lock 1 has a receiving member, more particularly an antenna which receives an energy field electromagnetic waves activating a circuit, including a chip storing information of the information carrier. The energy field source is disposed adjacent a shop check-out or trolley collecting station 20.

The information carrier 2 can be taken out of the pledge lock 1 and inserted into a check-out read/write apparatus located adjacent a trolley collection station. Alternatively, the information carrier 2 can always remain in the pledge lock 1 until the carriage is connected again. The embodiments shown in FIGS. 1 to 5 feature the pledge lock 1 having a freely accessible window 3.

The information carrier can be reached directly, or indirectly through the freely accessible zone 3. FIG. 5 shows the information carrier 2 directly reached by a contact member 4 which can be inserted through the zone 3 to contact the information carrier 2. The carrier can be read and/or inscribed upon such contact. As a result, it is unnecessary to have a complicated electrical device inside the pledge lock 1. The lock can even remain completely without electrical parts in the embodiments illustrated in FIGS. 1 to 5.

The window zone 3 is shown completely open in the embodiments illustrated in FIGS. 1 to 5. However, this zone can also be closed by a radiation-permeable material 31 shown in FIG. 2, such as glass or transparent plastics, so that the information carrier is protected from a mechanical damage. The window zone 3 can be located in a pledge lock pocket having the outwardly directed side (FIG. 2) made of a radiation-permeable material.

Figure 2:
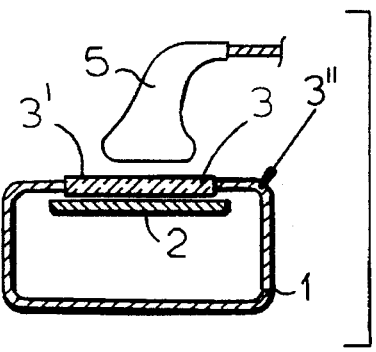
FIG. 2 is a vertical cross-sectional view of another embodiment of the pledge lock having a top window, behind which the pledge card can be read off via a manually movable scanner and/or written upon.

In the embodiment illustrated in FIG. 2 the information carrier lying in the open window zone 3 is scanned by a manual portable scanner apparatus 5. This apparatus can read, or write or both can also apply items of information to the carrier 2.

Figure 3:
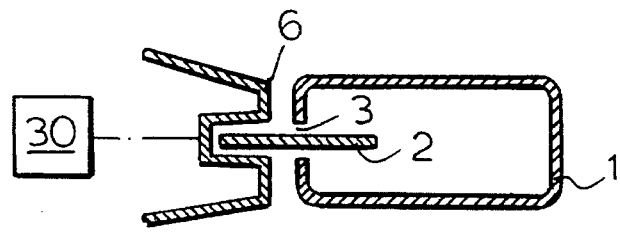
FIG. 3 is a vertical cross-sectional view of another embodiment of the pledge apparatus having a lateral opening, from which the pledge card partially projects, the projecting zone penetrating into a fixed device to be read and/or inscribed thereby.
Figure 4:
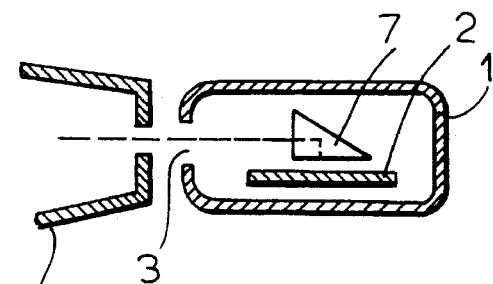
FIG. 4 is still another embodiment of the pledge apparatus wherein the pledge card remains inside the pledge lock and is read and/or inscribed by beams which are deflected by a prism/mirror.
Figure 5:
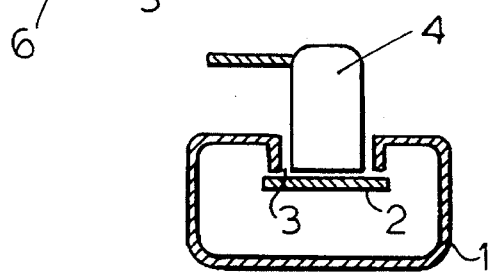
FIG. 5 is a vertical cross-sectional view of another embodiment of the pledge lock having a top window through which a contact apparatus can be inserted which can be moved to, more particularly brought into contact with the top side of the card.

The scanner 6 can also be stationary as shown in FIGS. 1, 3 and 4. The scanner 6 transmits optical beams or radiation of a different kind of wave. Advantageously, a scanner is a laser. This apparatus also can optionally write and/or read.

In the embodiment illustrated in FIG. 4 the signals generated by scanner 6 do not reach the carrier 2 directly, but are deflected, at right angles by a mirror or prism 7, so that the card lies horizontally in the pledge lock 1.

In the embodiment illustrated in FIG. 3, the carrier 2 is not completely disposed in the pledge lock 1, but projects outwardly through a window zone 3 and fits by its projecting zone in a fixed or movable device 6 which again reads and/or writes.

Figure 6:
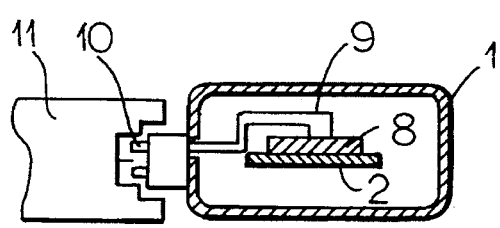
FIG. 6 is a vertical cross-sectional view of another embodiment of the pledge lock having a card against which contacts and/or read-write surfaces bear, the pledge lock being connected via outer contacts to a fixed or movable device.
Figure 7:
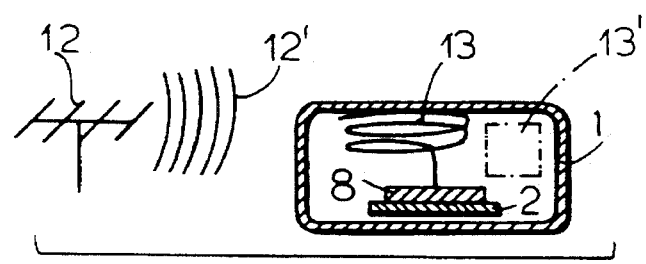
FIG. 7 is a vertical cross-sectional view of another embodiment of the pledge lock similar to that shown in FIG. 6, with which information is transmitted not via contacts, but without the use of wires.

In the embodiments illustrated in FIGS. 6 and 7 the pledge lock has electrical components. Disposed above the carrier 2 is a contact device and/or transmission device 8 which contacts the carrier 2 and reads and/or writes items of information optically, acoustically, magnetically and/or inductively. The device 8 is connected via cables 9 to contacts 10 on the outside of the pledge lock casing 1. The contacts 10 touch contacts of a contact member 11 as soon as the trolley travels to a fixed device 11 which has contacts 11. The contact members 11 can be manually applied to the contact 20 of the pledge lock 1. Similarly to the device 6 shown in FIGS. 3–4, the contact member 11 is disposed at a designated area 20 in the shop usually at a check-out or at a trolley collecting station or at an entrance/exit.

In the embodiment illustrated in FIG. 7 data is transmitted by a transmitter 12 located in the shop. Antenna 13 in the form of a coil is mounted inside the pledge lock 1. In the embodiment shown in FIG. 7 electromagnetic waves transmitted by transmitter 12 are converted and stored on the carrier 2. However, additionally or alternatively transmission can be performed in the reverse direction—i.e., the antenna 13 of the current source 13' can beam items of information to the outside transmitter 12. The waves 12' transmitted can be optical, acoustic, magnetic and/or inductive.

In all the aforementioned embodiments, items of information are read onto and written from the information carrier 2 automatically—i.e., as soon as the trolley has reached an area of the shop intended for this purpose.

By means of the aforementioned constructions, items of information concerning the customer, purchasing behaviour and/or prices, can be stored on the card and/or in the shop computer. As a result, information concerning rebates and/or lotteries can also be stored and interrogated.

What is claimed is:

1. An information system for a store, comprising a plurality of interlockable shopping trolleys, each of said trolleys being provided with a respective pledge lock securing a locked position of the trolley;

detaching means on each of the trolleys cooperating with the pledge lock for removably enabling release of the respective trolley;

means on each of the locks forming a respective opening;

an information carrier forming a pledge and carrying shopper information for a customer and removably inserted in the respective opening to unlock the pledge lock, said information carrier being retained in the unlocked pledge lock;

central information database means for storing information derived from and applicable to the respective carrier; and means separate from the pledge lock in the store and forming part of the central information database means for scanning the respective carrier while it is retained in the pledge lock for communication of information between the central information database means and the respective information carrier.

2. The information system defined in claim 1 wherein the information carrier is a plug-in member, a key, a card, or a parallelpipedic block.

3. The information system defined in claim 1 wherein the information carrier is provided with a magnetic layer for storage of the relevant information.

4. The information system defined in claim 1 wherein the pledge lock is provided with an antenna operatively connected with the means for scanning.

5. The information system defined in claim 1 wherein the means for scanning includes a contact member juxtaposed with the information carrier upon insertion thereof in the opening for transmitting items of personal information to the carrier.

6. The information system defined in claim 5 wherein the contact member is portable and connected with the pledge lock.

7. The information system defined in claim 1 wherein said means for scanning comprises optical means including for deflecting a light beam to the information carrier.

8. The information defined in claim 1 wherein the carrier is formed with contacts engaging respective contacts formed on the pledge lock in the opening.

9. The information system defined in claim 1 wherein the pledge lock is provided with a junction point provided with respective contacts and engaging the means for scanning.

10. The information system defined in claim 1 wherein the pledge lock has a window is covered by a layer of radiation-permeable material.

11. The information system defined in claim 1 wherein the means for scanning includes a fixed apparatus operatively connected with the central information database means and operated by the customer.

12. The information system defined in claim 1 wherein the information carrier is formed with an outer portion projecting over the pledge lock upon insertion of the carrier into the opening.

* * * * *